United States Patent [19]

Bott

[11] 4,106,681

[45] * Aug. 15, 1978

[54] SPARE TIRE EXTRACTION DEVICE

[76] Inventor: John A. Bott, 931 Lakeshore Dr., Grosse Pointe Shores, Mich. 48236

[*] Notice: The portion of the term of this patent subsequent to Aug. 9, 1994, has been disclaimed.

[21] Appl. No.: 696,029

[22] Filed: Jun. 14, 1976

[51] Int. Cl.² .............................................. B62D 43/00
[52] U.S. Cl. .................................. 224/42.12; 294/26; 296/37.2
[58] Field of Search ............... 224/42.13, 42.14, 42.24, 224/42.2, 42.21, 29 R, 42.44, 45 R, 45 P, 45 K, 45 F, 45 T, 55, 56, 57, 42.12; 294/26, 1 A, 15; 85/36; 296/37.2, 37 A; 214/451

[56] References Cited
U.S. PATENT DOCUMENTS

| | | | |
|---|---|---|---|
| D. 219,704 | 1/1971 | Ziaylek | D8/230 |
| 2,547,083 | 4/1951 | Lundgren | 224/42.44 X |
| 2,653,367 | 9/1953 | Orchoff | 85/36 X |
| 2,840,412 | 6/1958 | Lancaster | 294/26 |
| 3,712,586 | 1/1973 | Nicholson | 224/42.21 X |
| 3,940,041 | 2/1976 | Bott | 224/42.12 |

Primary Examiner—Trygve M. Blix
Assistant Examiner—Jerold M. Forsberg
Attorney, Agent, or Firm—Harness, Dickey & Pierce

[57] ABSTRACT

There is disclosed herein an elongated strap having a pair of spaced apart handles disposed thereon and adapted to be removably connected to a spare tire which is stored in a portion of a passenger vehicle thereby providing a means by which an individual may conveniently remove the spare tire from its storage location, as well as providing means by which the spare tire may be easily transported to any desired location by such an individual.

10 Claims, 6 Drawing Figures

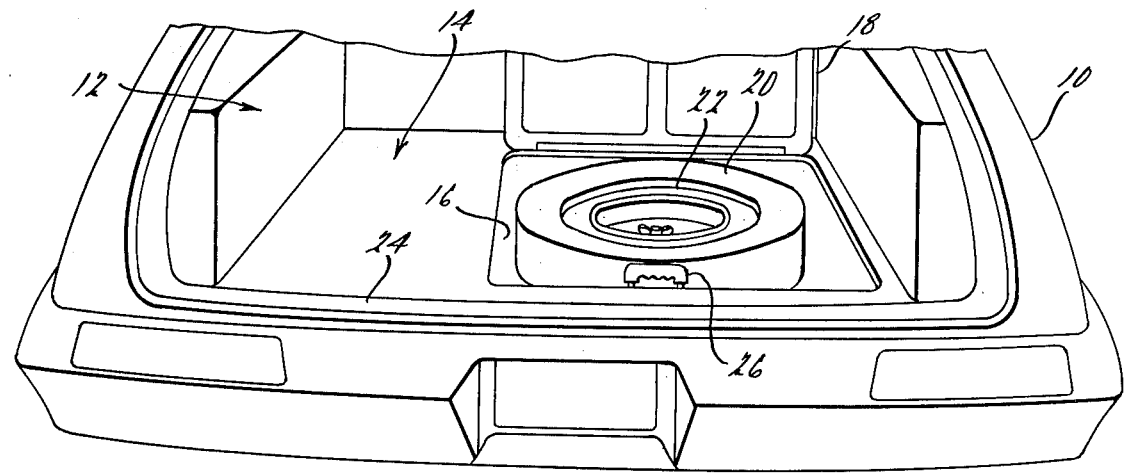
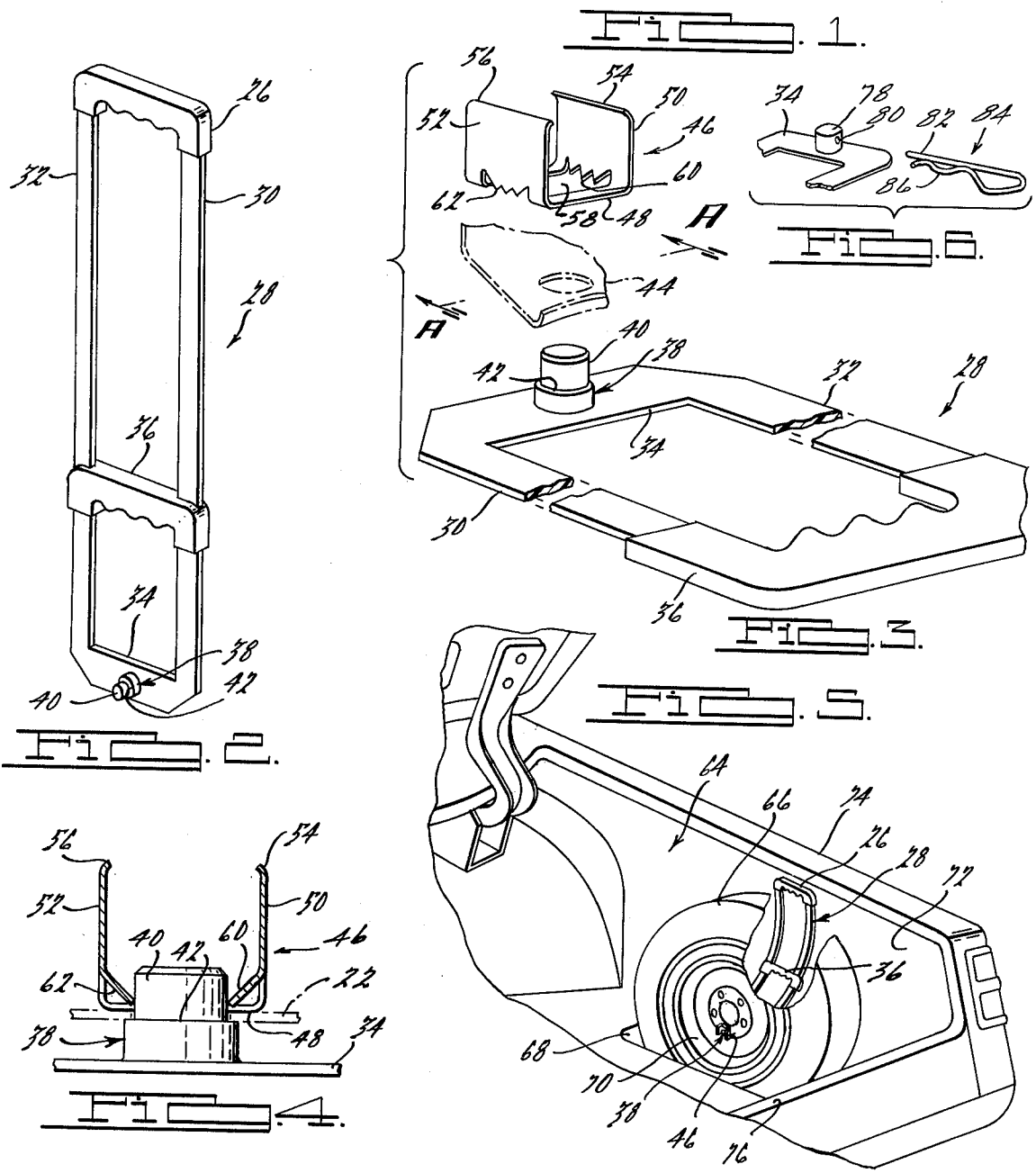

SPARE TIRE EXTRACTION DEVICE

BACKGROUND AND SUMMARY OF THE INVENTION

The present invention relates generally to devices having handles provided thereon and, more particularly, to a device adapted for removable attachment to a spare tire in such a manner as to provide assistance to an individual in removing the spare tire from a storage compartment, such as the trunk of a conventional passenger car, or the storage area of a station wagon, van or similar type utility vehicle.

In present day automobiles, spare tires are generally provided which are secured in out-of-the-way locations in the vehicle so as to provide maximum usable storage space in the vehicle itself. Typically, these out-of-the-way locations make it difficult and strenuous to remove the spare tire from its storage location, often necessitating various body contortions which may result in injury to an individual's back, as well as making it extremely likely that the individual will soil or may even tear his clothing in the process. As spare tires are heavy and lack suitable hand grip thereon, it is difficult to carry the spare to the desired location. Thus, an individual will normally roll the spare to the desired location, resulting in the tire becoming dirt covered, making the installation thereof a messy proposition. Further, the tire when transported by rolling, may escape from the control of the individual thereby creating a hazardous situation for both bystanders as well as other vehicle operators.

Accordingly, the present invention provides a device having a first handle by which an individual may easily slide the tire out of the trunk or other storage location of the vehicle without necessitating any unnatural body contortions. A second handle on the device provides means by which the individual may easily complete the removal of and transport the tire to any desired location, such as for installation on the vehicle in place of a deflated tire without bringing a tire up against himself and thereby soiling his clothing. The device is adapted to be easily and removably secured to the wheel by means of a clip attaching to a projection on the device which passes through one of the bolt holes provided in the wheel rim. The device may be easily integrally molded from a suitable plastic composition, thus allowing it to be easily cleaned. Further, should it be desirable, metal strips may be molded therein to further stiffen the strap thereby making it self supporting, although the plastic composition chosen may be sufficiently rigid to allow the strap to be self supporting without the addition of metal strips therein.

Other features and advantages of the present invention will become apparent from a review of the following detailed description of the preferred embodiment in which reference is made to the following drawings.

BRIEF DESCRIPTION OF THE DRAWINGS

FIG. 1 shows a typical automobile trunk having a spare tire located in a storage compartment in the bottom of the trunk with the present invention attached thereto;

FIG. 2 is a perspective view of a device in accordance with the present invention;

FIG. 3 is an exploded view showing a portion of the device in relation to a portion of a typical wheel rim and a clip for securing the device thereto;

FIG. 4 is a sectional view along lines A-A of FIG. 3 showing a portion of the present invention installed upon the wheel rim and the clip securing the device thereto;

FIG. 5 shows a portion of a vehicle trunk having a spare tire disposed in a vertical storage position with the device of the present invention installed in an operative relationship thereto; and FIG. 6 is a perspective view of a portion of the device illustrating an alternate attachment means.

DESCRIPTION OF THE PREFERRED EMBODIMENTS

FIG. 1 illustrates a typical passenger car 10 having a trunk 12 at the rear end thereof. The trunk 12 has a floor 14 therein in which is disposed a storage compartment 16 recessed below floor 14 which is generally concealed by a lid 18 which fits flush with the floor 14 of the trunk 12. Disposed within storage compartment 16 is a spare tire 20 mounted upon a wheel 22. Spare tire 20 is secured in storage compartment 16 by suitable means such as a bolt passing through a bolt hole provided in wheel 22 and a wing nut threadedly secured thereto so as to clamp spare tire 20 to the floor of storage compartment 16, thereby preventing relative movement of the tire 20 and wheel 22 within the compartment 16. Trunk 12 also has a lip 24 extending above floor 14.

It is readily apparent that in order for an individual to remove spare tire 20 from trunk 12, the individual must first lift tire 20 from storage compartment 16 to floor 14 and then again lift spare tire over lip 24. This requires that an individual lean far over the trunk in a less than ideal position for lifting of a heavy article, such as the spare tire 20, in order to dislodge it from the storage compartment 16 and move it up to floor 14, thus presenting the possibility of a back injury being incurred in the process and, at the minimum, requiring an individual to lean against the rear portion of the vehicle, possibly causing his clothing to become soiled.

Accordingly, the present invention provides a handle 26 at the terminal end of a strap which passes below tire 20 and is secured to wheel 22. Thus, an individual may easily remove the spare tire from compartment 16 by merely first removing the securing means holding the tire in compartment 16, grasping handle 26, and pulling up and outward. As handle 26 is positioned relatively close to the rear end or access portion of trunk 12, it eliminates the necessity of the individual leaning far over and into the trunk opening in order to remove the spare tire. Once the tire has been removed from storage compartment 16, a second handle provided on the extractor device (not visible in FIG. 1) may be easily used to transport spare tire 20 to any desired location.

Referring now to FIG. 2, there is shown the device of the present invention indicated generally at 28. Device 28 has a handle 26 having elongated members 30 and 32 extending in a substantially parallel spaced apart relationship from opposite lateral portions of handle 26. A portion 34 extends between and joins elongated members 30 and 32 at the opposite end from handle 26. A second handle 36 is provided which extends between elongated members 30 and 32 and is longitudinally positioned between handle 26 and member 34. Handle 36 is arranged generally parallel to the handle 26 and is spaced longitudinally closer to member 34 than the handle 26 so as to provide convenient means for transporting the spare tire 20. Both handles 36 and 26 are similarly shaped having relatively thick laterally extending portions suitably adapted to afford a comfortable manual grasping or engagement.

Centrally disposed on member 34 is a projection 38 generally cylindrical in shape and having a reduced diameter portion 40 so as to provide an annular shoulder 42 spaced away from member 34. Projection 38 will generally be integrally molded with member 34 and of similar material. However, if desired, it may also be fabricated of metal and either embedded in member 34 or secured thereto by any suitable means subsequent to fabrication of member 34. In any event, projection 38 is arranged at a generally right angle to the member 34 and is adapted for removable insertion into one of the bolt holes provided in conventional wheel rims for securing device 28 thereto, as will hereinafter be described.

FIG. 3 illustrates a portion of device 28 in an exploded perspective view showing the assembly thereof to a portion of a wheel rim 44 illustrated in phantom with a clip member 46 positioned thereabove which is adapted to secure device 28 to wheel rim 44. Clip member 46 is generally U-shaped in cross section having a bottom portion 48 and a pair of substantially parallel upward extending sidewall portions 50 and 52. The terminal end portions 54 and 56 of sidewall portions 50 and 52 respectively, are each turned inwardly a slight amount so as to present a relatively smooth outer surface for engagement by the fingers of an individual, as hereinafter described. Bottom portion 48 has a generally rectangularly shaped opening 58 provided therein and arranged generally equidistant between sidewall portions 50 and 52. A plurality of biting tooth-like projections 60 and 62 extend into opening 58 from respective sidewall portions 50 and 52 and are adapted to bitingly engage the reduced diameter portion 40 of cylindrical projection 38. This may be best seen with reference to FIG. 4 in which clip member 46 is shown secured to reduced diameter portion 40 so as to retain wheel rim 22 between shoulder 42 and clip 46. As may be readily seen, tooth-like projections 60 and 62 extend downward and inward from respective sidewall portions 50 and 52, as shown in FIG. 4. In order to remove device 28 from rim 22, such as when it is desired to install the spare tire 20 on the vehicle, an individual need only grasp sidewall portions 50 and 52 and squeeze them together a slight amount, which will then cause projections 60 and 62 to release portion 40, thereby allowing clip 46 to be easily removed from projection 38 and thus allowing removal of device 28.

Referring now to FIG. 5, there is shown another typical passenger car trunk 64 in which is disposed a spare tire 66. However, in this case, trunk 64 has a well portion 68 adapted to stow spare tire 66 in a vertical position. In this case, strap 28 is similarly secured to wheel rim 70 by clip member 46 in cooperation with cylindrical projection 38 of the device passing through a bolt hole of rim 70 in such a manner that device 28 extends upward between the tire 66 and inner surface 72 of fender 74 and is of a length such that handle 26 extends above tire 66 so it may be easily grasped by an individual while the tire is disposed in its storage position. In this application, it is important that device 28 be fabricated in such a manner as to impart sufficient stiffness to allow it to be self supporting so as to prevent handle 26 from slipping down behind tire 66. Thus, an individual desiring to remove the spare tire 66 may easily release the wheel securing means (analogous to the aforesaid bolt and nut on wheel 22), grasp handle 26 pulling inwardly and away from fender portion 74, thus removing the wheel from its storage well. The individual may then grasp handle 36 in order to lift wheel 66 over lip 76 and out of trunk 64 so as to be able to install the wheel on the vehicle.

An alternative means of removably attaching the device to a rim is illustrated in FIG. 6. In this embodiment, portion 34 has a projection 78 centrally disposed thereon and of a generally cylindrical shape. Projection 78 has an aperture 80 extending radially therethrough adjacent the end portion thereof which is of a suitable size to receive leg 82 of spring clip fastener 84. Projection 78 may be formed with or subsequently attached to portion 34, as previously described. In either event, the device may be easily attached to a wheel rim by merely inserting projection 78 through one of the bolt holes of the rim and then inserting leg 82 of spring clip fastener 84 through aperture 80. Leg 86 will provide a spring action to prevent leg 82 from slipping out of aperture 80.

It is thus readily apparent that the device disclosed herein provides a means by which a spare tire may be easily removed from its storage position for any intended purpose. While the convenience provided by the device is applicable to all, it is particularly of great assistance to a female driver who, while knowing how to change a flat tire, may find it difficult, if not impossible, to lift the heavy and bulky spare tire from its storage location and transport it to the desired location. Additionally, the second handle provided on the device allows one to easily transport the tire.

While it is thus apparent that the preferred embodiment of the invention disclosed above greatly facilitates the removal of a spare tire from its storage location in a typical passenger car, it will be appreciated that the invention is susceptible to modification, variation and change without departing from the proper scope or fair meaning of the subjoined claims.

I claim:
1. In combination,
an automotive vehicle having a longitudinal axis and a spare tire storage area,
a generally upstanding wall along an access side of said storage area,
a spare tire assembly including a tire and wheel,
said wheel having a plurality of holes formed therein and a flexible strap having a length equal to at least the radial distance between said holes and the outer periphery of said assembly and having a fastening element at one end thereof, a first handle at the opposite end thereof and a second handle at an intermediate position between said fastening means and said first handle,
said fastening element extending axially through and cooperative with one of the holes for securing said one end of said strap to said assembly,
said strap having a main body portion and extending radially of said assembly along one side thereof from said one hole to a position where said first handle may be conveniently grasped by a person reaching into said storage area, whereupon said strap may be pulled in a direction causing said assembly to move toward a first position partially out of said storage area, whereby the person may grasp the second handle and continue to pull said strap until said assembly is removed from said storage area.

2. The invention as set forth in claim 1 wherein said fastening element comprises a cylindrical projection extending outward from said strap and adapted to pass through said one hole on said wheel, and clip means adapted to releasably engage said cylindrical projection in such a manner as to secure said wheel between said connecting means and said clip means.

3. The invention as set forth in claim 2 wherein said spare tire and wheel assembly is disposed in a horizontal storage position, said strap extending below said tire and wheel assembly and being of such a length as to allow said first handle to be accessible without movement of said tire and wheel assembly.

4. The invention as set forth in claim 3 wherein said strap is flexible yet has sufficient stiffness to be self supporting.

5. The invention as set forth in claim 2 wherein said clip means comprises a bottom portion having an opening adapted to accommodate said cylindrical projection disposed therein; spaced apart substantially parallel sidewall portions extending away from one side of said bottom portion, each of said sidewall portions having a plurality of pointed projections extending toward said opening and adapted to bitingly engage said cylindrical projection, said projections being further adapted to release said cylindrical projection when said sidewall portions are pressed toward each other.

6. The invention as set forth in claim 1 wherein said tire and wheel assembly is disposed in a vertical storage position, said strap extending upward along one side of said tire and wheel assembly and being of such a length as to provide easy access to said first handle when said tire and wheel assembly is in said storage position.

7. The invention as set forth in claim 2 wherein said cylindrical projection is integrally formed on a portion of said strap.

8. The invention as set forth in claim 2 wherein said strap, said first handle means, said second handle means and said cylindrical projection are all integrally formed.

9. The invention as set forth in claim 2 wherein said second handle means is spaced apart from said first handle means a substantially greater distance than from said cylindrical projection.

10. The invention as set forth in claim 2 wherein said cylindrical projection further includes a reduced diameter portion and an annular shoulder portion, said shoulder portion being adapted to engage said wheel and said clip means being adapted to engage said reduced diameter portion in such a manner as to allow said wheel to be secured between said clip means and said shoulder.

* * * * *